United States Patent [19]
DeVita et al.

[11] 3,884,123

[45] May 20, 1975

[54] FLOW SENSITIVE HYDRAULIC CONTROL VALVE

[75] Inventors: Fosco L. DeVita, Chicago; Frank J. Simak, Hickory Hills, both of Ill.

[73] Assignee: International Harvester Company, Chicago, Ill.

[22] Filed: May 21, 1973

[21] Appl. No.: 361,922

Related U.S. Application Data
[63] Continuation of Ser. No. 61,959, Aug. 7, 1970.

[52] U.S. Cl. ................ 91/447; 91/418; 137/624.27
[51] Int. Cl. ............................................ F15b 13/01
[58] Field of Search ............................. 91/418, 447; 137/624–627

[56] References Cited
UNITED STATES PATENTS

| | | | |
|---|---|---|---|
| 2,848,014 | 8/1958 | Tennis | 137/624.27 |
| 3,106,065 | 10/1963 | Stacey | 137/624.27 X |
| 3,132,668 | 5/1964 | Stacey | 137/624.27 |
| 3,247,768 | 4/1966 | Tennis | 137/624.27 X |
| 3,618,634 | 11/1971 | Nelson | 91/418 X |

FOREIGN PATENTS OR APPLICATIONS

| | | | |
|---|---|---|---|
| 963,922 | 7/1964 | United Kingdom | 137/624.27 |

*Primary Examiner*—Irwin C. Cohen
*Attorney, Agent, or Firm*—Floyd B. Harman; Ronald C. Kamp

[57] ABSTRACT

A hydraulic directional control valve for supplying fluid to a hydraulic motor and incorporating one or more fluid flow sensing valves and a hydraulic latching mechanism. The latching mechanism holds the control valve in a selected operative position until the hydraulic motor completes its working stroke, the flow sensing valves determining when flow to the hydraulic motor ceases and permitting the application of fluid pressure to unlatch the latching mechanism and allowing the automatic return of the control valve to a neutral position. The flow sensing valves also function as check valves to prevent the return of fluid into the fluid supply line.

4 Claims, 1 Drawing Figure

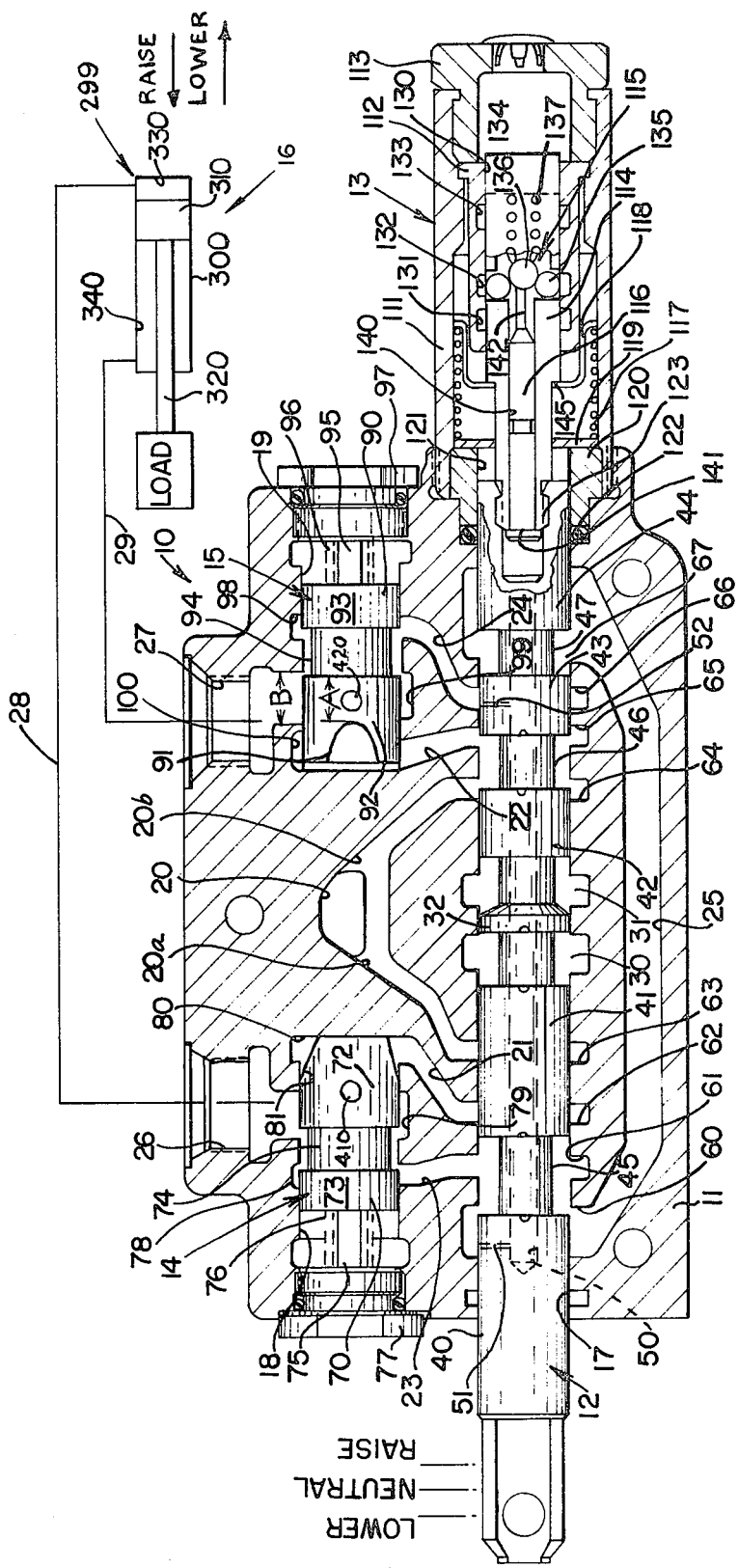

FLOW SENSITIVE HYDRAULIC CONTROL VALVE

This is a continuation, of application Ser. No. 61,959, filed Aug. 7, 1970.

BACKGROUND OF THE INVENTION

This invention relates to hydraulic directional flow control valves having a reciprocable spool for controlling the flow of fluid to and from hydraulic cylinders and more particularly to a flow sensitive detent mechanism which holds the spool in a selected position until flow ceases, at which time the spool is returned to a neutral position.

Systems utilizing such control valves may include a source of fluid energy such as a pump, a reservoir, the control valve and the hydraulic motor, with a system relief valve being interposed within the conduit system for safety purposes. Hydraulic control valves having latching or detent mechanisms that are unlatched and returned to neutral when the hydraulic motor reaches the end of its stroke are well known and are exemplified by U.S. Pat. No. 2,848,014.

Because of manufacturing tolerances required on system relief valves and on the unlatching mechanisms, and of the need to provide for wear on these parts with use, the pre-determined unlatching pressure of a conventional valve must be lower than the maximum system relief valve pressure by as much as 25 percent. This means that the work cylinder must be of sufficient size to operate for its intended use without exceeding 75 percent of the maximum relief valve pressure. Thus, with a conventional unlatching control valve, the hydraulic motor must, therefore, be overdesigned by as much as 25 percent to perform its intended function or the unlatching mechanism may permit the control valve to return to neutral before the cylinder reaches the end of its stroke. Similarly, a specific detent mechanism must be designed for each system, depending upon desired operating pressures.

SUMMARY OF THE INVENTION

It is an object of the present invention to provide a hydraulic control valve with a flow sensitive latching mechanism for directing fluid to a hydraulic cylinder, the flow sensitive structure being effective to keep the control valve from unlatching and returning to a neutral position until the piston reaches the end of its stroke, even if the system pressure approaches relief valve pressure during a piston stroke.

It is also an object to provide a control valve of the type described, the operation of which is substantially independent of the system pressure, thus permitting system designers to utilize work cylinders smaller in size than heretofore used in systems for a given application.

It is another object to provide a control valve that is nearly universal in application and can be used in many systems regardless of the absolute magnitude of the system pressure or of the maximum relief valve pressure.

It is an additional object to provide flow sensitive control valves as described that also function as check valves to prevent the return of fluid to the fluid supply line.

BRIEF DESCRIPTION OF THE DRAWING

FIG. 1 is a longitudinal sectional view of the flow sensitive hydraulic control valve of the present invention.

DESCRIPTION OF THE PREFERRED EMBODIMENT

As disclosed in the preferred embodiment the hydraulic control valve is of the open center type and is designated generally by the numeral 10 and comprises a housing 11, a cylindrical spool 12, a latching mechanism 13, and flow sensing valves 14 and 15 for controlling the operation of a hydraulic motor 16.

The housing 11 is formed with a longitudinal cylindrical bore 17 which contains the reciprocal spool 12 and cylindrical bores 18 and 19 which contain the flow sensing valves 14 and 15, respectively. The housing 11 is also formed with an inlet conduit 20 connected to two high pressure branch passages 20a and 20b as well as open center passages 30, 31 (the connection with the latter passages not being shown). Also within the housing are outlet conduits 21 and 22, fluid return conduits 23 and 24, and a drain conduit 25. The inlet conduit 20 and open center passages 30, 31 are connected to be supplied with fluid from a pump or source (not shown) while the drain conduit 25 empties into a fluid sump or reservoir (not shown). The housing 11 is also formed with fluid outlet ports 26 and 27 connected by means of external conduits 28 and 29, respectively, to the hydraulic motor 16.

The hydraulic motor here illustrated is a piston and cylinder arrangement such as may be used, for example, in operating front loader equipment in association with tractors or the like. The piston and cylinder arrangement 299 comprises a cylinder 300 and a piston 310 slidably disposed within the cylinder 300. The piston 310 is connected by means of a shaft 320 to raise and lower, or otherwise move a load. The piston 310 separates the cylinder 300 into two chambers which may be designated as a "Raise" chamber 330 and a "Lower" chamber 340. The motor 299 is only an example of one type of a positive displacement motor having a predetermined stroke and fluid capacity. The hydraulic control valve 10 can be useful in numerous working applications and the "Raise-Lower" functions are only by way of example.

The spool 12 is generally in the form of a cylindrical rod and is formed with fluid sealing lands 40, 41, 32, 42, 43 and 44 and with annular grooves 45, 46 and 47. The groove 45 is formed between lands 40 and 41, the groove 46 between lands 42 and 43, and the groove 47 between lands 43 and 44. The spool 12 is also formed with an axial central bore 50 throughout most of its length, and relatively small diameter radial bores 51 and 52 communicating with the central bore 50 and extending radially outward through the lands 40 and 43, respectively. The lands 40, 41, 42 and 43 may be provided with metering notches as indicated.

The housing 11 is formed annular internal annual grooves or fluid ports 60, 61, 62, 63, 64, 65, 66 and 67 within the bore 17 and which are adapted to be selectively sealed or opened by the lands of the spool valve 12 when reciprocated relative to the normal diameter of the bore 17. The ports 60 and 67 open into the drain conduit 25; the port 61 opens into the return conduit 23; the port 62 opens into outlet conduit 21; ports 63 and 64 open into the inlet conduit or high pressure branches 20a and 20b, respectively; port 65 opens into outlet conduit 22; and port 66 opens into return conduit 24.

The flow sensitive or control valve 14 comprises a piston 70 having an end plate (not shown) and a cylindrical surface having fluid sealing lands 72 and 73, and an annular groove 74 between the lands. A spring 76 extends into the piston 70 and is compressed between the forward face or end plate and plug 77 threaded into the end of the bore 18 with stem 75 serving as a spring guide. Internal annular grooves or fluid ports 78, 79 and 80 within the bore 18 are adapted to be sealed by the lands of the piston 70 as it reciprocates within bore 18, the position disclosed being referred to as the closed position of this valve. The port 78 is open to the return conduit 23; the port 79 communicates with the outlet port 26; and port 80 opens into the outlet conduit 21. The spring 76 tends to bias the piston 70 into a closed position as shown.

The flow sensitive or control valve 15 is substantially a mirror image of the valve 14 and comprises a cylindrical piston 90 formed with fluid sealing lands 92 and 93, an annular groove 94 between the lands, an axially extending stem 95, and a spring 96. The spring 96 surrounds the stem 95 and is compressed between the piston 90 and a plug 97 threaded into the end of the bore 19. Internal annular grooves or fluid ports 98, 99 and 100 within the bore 19 are adapted to be sealed or opened by the lands of the piston 90 meshing with the normal diameter of bore 19. The port 98 is open to the return conduit 24; the port 99 communicates with the outlet port 27; and the port 100 opens into the outlet conduit 22. The spring 96 tends to bias the piston 90 into a closed position as shown.

Both pistons 70 and 90 have metering notches 81 and 91, which extend rearwardly to limit the longitudinal dimension of the full diameter (A) of lands 72 and 92 to a lesser dimension (B) than ports 79 and 99. Thus as pistons 70 or 90 close, a small metered amount of fluid may pass from port 80 or 100 into port 78 or 98 respectively. The metering notches 81 and 91 cause a drop in pressure as fluid flows thereacross, the lower pressure being transmitted through the apertures 410 and 420 to the back side of the respective pistons 70 and 90.

The latching mechanism 13 comprises a tubular housing 111; threadedly attached to housing 11 and a detent sleeve 112 anchored within the housing 111 by a cap screw 113. A detent carrier 114 mounted on spool 12 is slidably disposed within the sleeve 112 and carries a ball detent mechanism 115 as well as a hydraulic unlatching piston 116. A centering spring 117 surrounds the carrier 114 and is compressed between a spring retaining cup 118 mounted on sleeve 112 and a sliding washer 119. Collar 120 serves as an abutment for washer 119 and a cylindrical bore 121 through the collar receives the land 44 of the piston 12. An "O" ring 122 forms a fluid tight seal against the land 44. The piston 114 is threaded at 123 into the end of the valve spool 12.

The detent sleeve 112 is formed with a central bore 130 for receiving the carrier 114 and is provided with internal annular detent grooves 131, 132 and 133. The detent ball mechanism 115 comprises three radially movable detent balls 135 which are caged within the carrier 114, an axially movable backing ball 136, and a bias spring 137. The spring 137 is compressed between backing ball 136 and the interior end of carrier 114 to urge the backing ball 136 against the balls 135 tending to move them outward into engagement with one of the grooves 132 and 133.

When the valve spool 12 and detent carrier 114 are moved to a position so that the balls 134 and 135 do engage a groove, the biased backing ball 136 effectively latches the piston 114 in place until the spring bias is removed, or manually overcome. The latching mechanism 115 is unlatched hydraulically by the piston 116 which is slidably disposed within a cylindrical bore 140 formed in the piston 114 and has a head 141 exposed to fluid pressure existing within the bore 50 and an axially extending pin 142 adapted to contact the backing ball 136. The mechanism 115 is unlatched whenever the force due to fluid pressure acting on the head 141 exceeds the force of the spring 137.

The spool 12 is normally returned to and held in a "Neutral" position by the action of the centering spring 117. The carrier 114 is formed with a shoulder at 145 against which the spring retaining cup 118 abuts, and the washer 119 bottoms-out against the collar 120. The spring 117 is normally compressed, and movement of the valve spool 12 and piston 114 to the left to a Lower position compresses it still further against the washer 119. Movement of the spool 12 to the right to a Raise position causes the land 44 to extend outward through the bore 121 and forces the washer 119 to again compress the spring 117. The spring 118 thus tends to return the valve piston 12 to a central or Neutral position from either of the two selectively operative positions.

In operation, the control valve 10 is assumed to start initially in the Neutral position in which position the lands 41 and 42 block the respective inlet ports 63 and 64, and no fluid from the source can pass to the cylinder 300. Thus, as in conventional open center valves, fluid delivered thereto will pass through open center passages 30 and 31 unrestricted by lands 32 or 41 and return to sump in the normal manner.

FIG. 1 shows the control valve 10 in the Lower position with ram 16 completing its stroke. Gradual movement of the spool 12 from the Neutral toward the Lower position causes the land 32 to close open center passages 30 and 31, and fluid is directed to high pressure passages 20a and 20b through inlet 20. Land 42 opens the port 64 and allows fluid to flow through the groove 46, port 65 and conduit 22 to pressurize the port or cavity 100. When this pressure exerts a force sufficient to overcome the force of the spring 96, the piston 90 is moved rearwardly and fluid flows through the ports 99 and 27 and conduit 29 to the Lower chamber 340 of the cylinder 300. While the piston 90 is in the open position to permit flow to chamber 340, the land 92 blocks the flow of fluid into the return conduit 24, and the load moves to the right.

Complete movement of the spool 12 to the Lower position, as shown in FIG. 1, allows the detent mechanism to engage the groove 132 to latch the piston 12 in place. The ports 64 and 65 are uncovered to allow unrestricted flow of fluid to the piston 15 where a small pressure drop occurs across the metering notches 91 as the fluid flows to the chamber 340, and the port 60 is uncovered to allow unrestricted return of fluid from the chamber 330. When the piston 310 reaches the end of its stroke to the right, fluid flow to the chamber 340 stops, the pressure drop across the notches 91 disappears, and the spring 96 causes the piston 90 to move to the left. Apertures 420 permit fluid to be admitted to the interior of piston 90 so as to balance fluid pressure forces acting to open or close same. During movement of piston 90 to its closed position, the metering notch 91 or a properly dimensioned land 92 which has less width than port 99 will permit some fluid from conduit 22 to be diverted around land 92 and groove 94 to return conduit 24 and radial port 52 to pressurize the bore 50. Fluid pressure within the bore 50 actuates the piston 116 to unlatch the detent mechanism 115, and the spring 117 again returns the piston 12 automatically to the Neutral position. Thus piston 90 is responsive to flow to chamber 340, and upon cessation, it is effective to direct fluid pressure to unlatching mechanism 13.

The load is caused to be raised by the piston 310 by moving the spool 12 to the right to the Raise position (not shown). Initial movement of the spool 12 to the right causes the land 41 to close open-center passages 30, 31 and fluid is directed to high pressure passages 20a and 20b. Simultaneously land 41 uncovers the inlet port 63 and permits fluid to flow to conduit 21. Further movement of the spool 12 to the right latches the detent mechanism 115 in the groove 133 and allows unrestricted flow of fluid from the inlet conduit 20a through the port 63, annular groove 45, outlet conduit 21, past the piston 70 and through the outlet port 26 and conduit 28 to the chamber 330 of the cylinder 300. Whenever the force due to fluid pressure within the port or chamber 80 exceeds the force of the spring 76, the piston 70 is moved to the left or rearwardly and fluid is allowed to flow to the work cylinder 300. When the piston 70 is sufficiently open, the land 72 blocks the flow of fluid into the return conduit 23 and continued flow to cylinder 300 will maintain piston 70 in its open position. The latched control valve 10 allows fluid to flow to the cylinder 300 until the stroke is completed at which time the flow control piston 70 returns to its closed position due to cessation of flow, aperture 410 balances any forces acting thereon but for that of spring 76. Since land 72 is not of sufficient width to seal port 79, fluid energy from passage 21 will pass around land 72 through the annular groove 74, port 78, and return conduit 23 through port 61 and radial orifice 51 to fill and pressurize the bore 50. When this fluid pressure within the bore is sufficient to actuate the piston 116, the mechanism 115 is unlatched and the spool 12 is returned automatically to Neutral. Although exposed to drain conduit 25, axial bore 52 does not preclude this increase in pressure since it acts as a restrictor. In the Neutral position, spool 12 blocks any further escape of fluid from the cylinder 30.

When fluid is directed to chamber 330, the fluid in the chamber 340 is returned through the conduit 29, port 27, groove 94, conduit 24, port 66, and annular groove 46 into the drain conduit 25.

It should be noted that the flow sensing valves 14 and 15 sense when fluid flow to the work cylinder 300 stops. They do so in a manner substantially independently of the magnitude of the fluid pressure within the system, and their operation does not depend on the setting of the system relief valve which is assumed to be present in the system but is not shown. Instead, piston valves 14 and 15 respond only to a fluid flow. It should also be noted that the valves 14 and 15 function as check valves to prevent the return of fluid through the inlet conduits 20a and 20b, as might occur during operation under load and in the event of supply pump failure.

In summary, the flow sensitive valves prevent the control valve from unlatching and returning to neutral until the work piston reaches a limit of its stroke, even if the system pressure rises to the maximum relief valve pressure during a piston stroke. since the operation is independent of the system relief valve pressure, the control valve of the present invention can be used in nearly any similar hydraulic system. The provision of the flow sensitive valves eliminate the need for a separate reverse flow check valve because the flow sensitive valves block the return flow of fluid into the fluid inlet conduits. such valves may be similarly integrated into a closed center valve as well as the open center system herein disclosed.

It is to be understood that the invention shown and described is by way of example only and is not to be considered as limited thereto except insofar as the claims may be so limited.

What is claimed is:

1. In combination, a hydraulic control valve, a source, and a work cylinder having a work piston therein, said valve comprising:

a housing having first and second bores;

a selectively movable control valve member slidable in said first bore;

means for latching said control valve member in a selected position;

a fluid pressure actuated unlatching mechanism capable of releasing said latching means;

a flow sensitive valve piston formed with a fluid sealing land slidably disposed within said second bore;

said housing having a fluid inlet conduit connected with said first bore, a fluid outlet conduit connected with said work cylinder and a fluid return conduit, means in said return conduit connectable to said unlatching mechanism, and all of said conduits opening into said second bore;

said inlet and return conduits at their juncture with said second bore being spaced apart a distance greater than the axial width of said land;

whereby said land allows fluid to flow from said inlet conduit to said outlet conduit and blocks the passage of fluid to said return conduit and said unlatching mechanism while fluid is flowing from said inlet to said outlet conduits, but permits the same when flow ceases.

2. In combination, a hydraulic control valve, a source, and a fluid motor, said valve comprising:

a housing;

a control valve spool slidable in said housing to operative positions on either side of a center neutral position;

a latching mechanism for holding said spool in a selected one of said operative positions;

centering means for urging said spool toward its neutral position;

a fluid pressure actuated unlatching mechanism effective to release said latching mechanism and allow said centering means to return said spool to its neutral position;

a flow sensitive valve piston in said housing and separated from said valve spool;

an inlet conduit in said valve housing extending between said spool and said valve piston;

an outlet conduit in said valve housing connected with said valve piston and said fluid motor;

a return conduit in said valve housing connected with said valve piston and means in said return conduit capable of communicating with said unlatching mechanism;

said valve piston being movable between an open position and a closed position, spring means for biasing said piston toward its closed position, said valve piston in said open position permitting communication between said inlet and outlet conduits when fluid is flowing therebetween while simultaneously blocking said return conduit, and when flow therebetween ceases, said valve piston moves to its closed position wherein communication between said inlet and outlet conduits is blocked; and said valve piston having a land of sufficient width to permit communication between said return and inlet conduits as said valve piston approaches its closed position whereby fluid pressure is directed to said unlatching mechanism to permit said spool to return to its center neutral position.

3. A hydraulic control valve according to claim 2, wherein said flow sensitive valve piston is provided with an annular groove which, in said closed position provides fluid communication between said outlet and return conduits; and whereby fluid may be freely exhausted from said fluid motor when said spool is positioned in another of its said operative positions.

4. A hydraulic control valve according to claim 3, wherein said valve piston is provided with a metering notch adjacent said land and near one end of said valve piston; and a passage extending from said land to the end of said valve piston opposite said notch; whereby flow between said inlet and outlet conduits results in a pressure drop thereacross and the absence of flow removes said pressure drop with said passage equalizing the pressure on both ends of said valve piston thereby permitting the valve piston to move forward its closed position.

* * * * *

UNITED STATES PATENT OFFICE
CERTIFICATE OF CORRECTION

PATENT NO. : 3,884,123
DATED : May 2, 1975
INVENTOR(S) : Fosco L. DiVita and Frank J. Simak It is certified that error appears in the above-identified patent and that said Letters Patent are hereby corrected as shown below:

In the above mentioned patent please correct inventor's name from Fosco I. DeVita to Fosco I. DiVita Signed and Sealed this thirtieth Day of September 1975

[SEAL]

Attest:

RUTH C. MASON
Attesting Officer

C. MARSHALL DANN
Commissioner of Patents and Trademarks